United States Patent [19]

Oakey

[11] 4,182,361
[45] Jan. 8, 1980

[54] FIRE HYDRANT PROTECTION DEVICE

[75] Inventor: Edwin J. Oakey, Fraser, Mich.

[73] Assignee: Hydra-Guard Corporation, Fraser, Mich.

[21] Appl. No.: 842,452

[22] Filed: Oct. 17, 1977

[51] Int. Cl.² .......................... E03B 9/02; F16K 35/06
[52] U.S. Cl. ................................. 137/296; 137/382.5; 137/800; 220/210; 220/284
[58] Field of Search ................ 220/210, 284; 137/296, 137/382.5, 800, 294, 382; 70/165; 138/89

[56] References Cited

U.S. PATENT DOCUMENTS

| 371,509 | 10/1887 | Kupferle | 137/382.5 |
| 3,556,131 | 1/1971 | Diaz | 137/382.5 |
| 3,935,877 | 2/1976 | Franceschi | 220/284 X |

OTHER PUBLICATIONS

Advertising Literature, *Vandal-Proof Safe-T-Lock Hydrant Protector*, Alco Industries, 23rd St. & Euclid, Chicago Heights, Ill., 60411.

Primary Examiner—Martin P. Schwadron
Assistant Examiner—Richard Gerard
Attorney, Agent, or Firm—Harness, Dickey & Pierce

[57] ABSTRACT

There is disclosed herein a fire hydrant protection device which prevents unauthorized individuals from tampering with or operating fire hydrants. In one form the protection device provides an outlet cap member provided with a projection suitable for engagement by a special wrench such as for removal or installation of the cap and a cover member movably associated therewith which includes provisions preventing access to the cap member projection by conventional tools thus insuring that only authorized individuals will be able to remove the device. In another form, the device is designed to be installed over the valve actuating mechanism so as to similarly prevent access thereto by individuals not having the special wrench.

13 Claims, 6 Drawing Figures

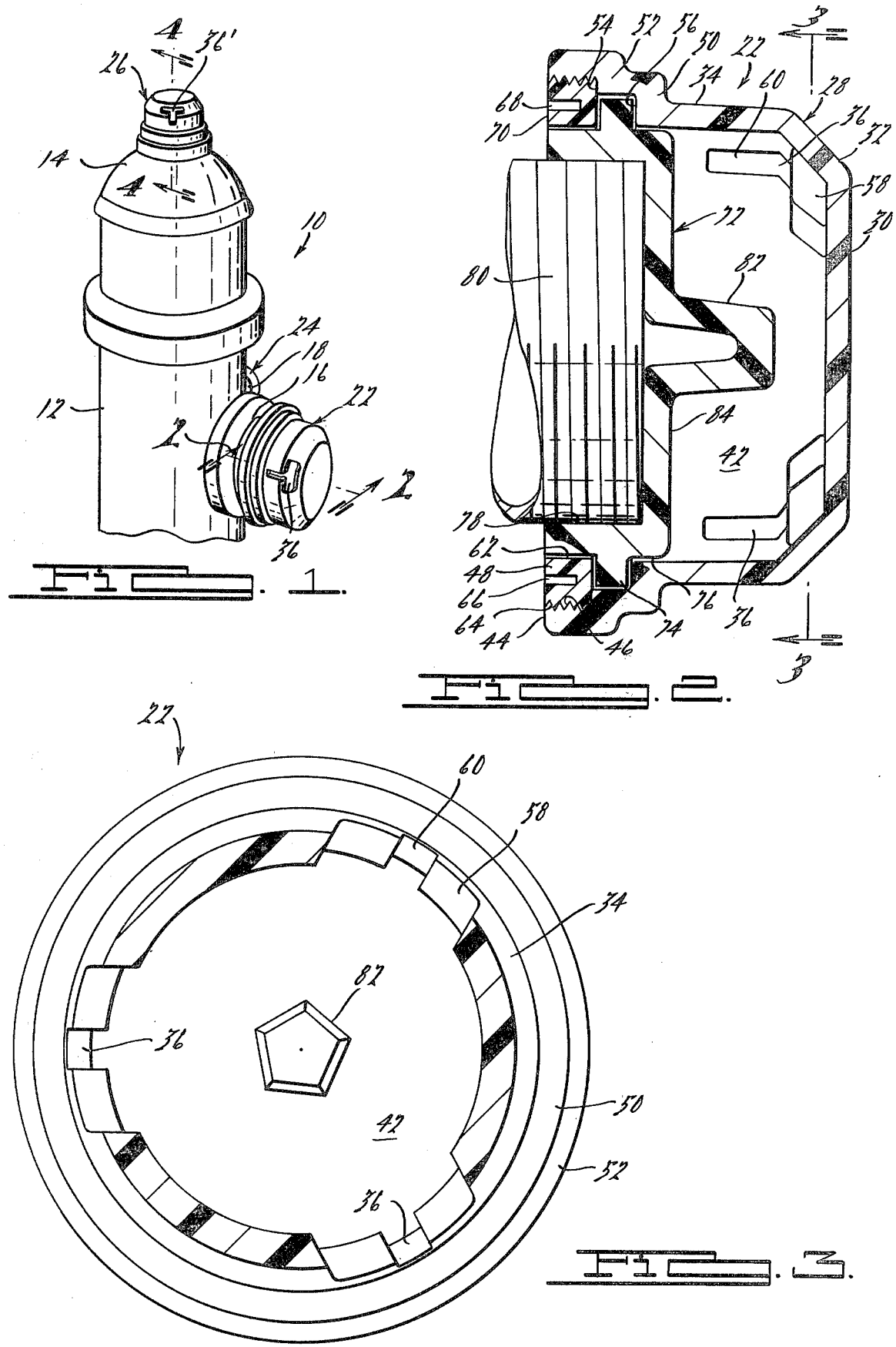

FIRE HYDRANT PROTECTION DEVICE

BACKGROUND AND SUMMARY OF THE INVENTION

The present invention relates generally to protection devices for fire hydrants and more particularly to such protection devices as are specifically adapted to prevent unauthorized operation of and/or access to the water outlets of the fire hydrant.

Fire hydrants are generally provided in any area having community water service and normally comprise a generally cylindrical member projecting a substantial distance above ground level which is provided with one or more water outlet connections on side portions thereof and a valve actuating member extending outward from an upper portion thereof. Typically, the water outlet connections are in the form of pipe stubs secured to sidewall portions of the hydrant having a threaded outer end to which a cap member is secured so as to prevent dirt, debris, or other objects from being thrown or blown into the water outlet. Typically, these cover members are provided with a portion suitable for engagement by a conventional wrench so as to allow them to be removed thereby enabling connection of a fire hose or the like. These fire hydrants are provided to provide a source of water for the community fire department or other governmental agencies; however, these devices provide a readily available and free source of water for the taking as well as presenting an attractive toy for area children to play with. Accordingly, authorities often encounter removed and missing outlet caps. Once the cap member has been removed, the opening thereby exposed provides an attractive receptacle for the deposit of various debris, such as by children or other individuals as well as allowing blown dust and dirt or the like to be deposited therein by the wind. While accumulations of small articles or debris may not pose a problem, authorities have often encountered rocks, glass and other large debris. Such accumulations pose a definite hazard in that should a fire occur within the area requiring the hydrant be pressed into service, the fire department may connect hose lines from the hydrant to their pumper vehicles without taking time to flush the hydrant. Such debris accumulated within the hydrant may be carried through the water line by the water flow into the pump mechanism causing excessive wear or damage to the pump. Further, even assuming the debris is able to pass through the pump mechanism without causing damage thereto, it may be fed into the fire fighting lines with the possibility of cutting off or reducing water flow therethrough. In either event the consequences of such accumulations of debris may be catastrophic.

Another problem often encountered with fire hydrants particularly in the Northern parts of the country results when unauthorized individuals operate the valve actuating means thereby allowing the interior of the hydrant to fill with water which may cause damage to the hydrant should temperatures drop below freezing. If the water outlet cap members have not been removed, there will be no visible sign that the hydrant has been tampered with and the condition may go unnoticed for long periods of time sufficient for cold weather to freeze the water resulting in damage to the hydrant or otherwise rendering it inoperative. Also, even in areas not generally encountering freezing conditions, the easy accessibility and operation of the hydrant valve actuators enables individuals to obtain large quantities of water without cost.

There is presently one device available of which applicant is aware which is designed to prevent unauthorized operation of fire hydrant actuator valves. The device comprises a cylindrical member which is secured to the valve actuator projection and includes an overlying cap member which limits access to the cylindrical member and is rotatable with respect thereto. The cylindrical member is provided with a pair of flat surfaces along opposite edges thereof which may be engaged by a special wrench and to which access is limited by the overlying cap member. However, as such devices are fabricated from steel they are relatively expensive. Further, while this device may be effective to prevent tampering with the valve actuator of the hydrant, it does not prevent removal of the water outlet caps.

Accordingly, the present invention provides a protection device which overcomes these problems and disadvantages in that it may be fabricated inexpensively, is easily installed, and yet provides excellent protection against operation of the valve actuator and/or removal of the water outlet caps. The device provides means which in one form is adapted to prevent access to the valve actuator for all but a specially designed wrench and in another form provides a water outlet cap member which may only be removed by use of the same or similar wrench. Thus, not only may the hydrants be protected against unauthorized operation of the valve actuator but also protection is afforded against accumulation of debris within the hydrant.

Additional advantages and features of the present invention will become apparent from the following detailed description of the preferred embodiments and the appended claims taken in conjunction with the accompanying drawings.

BRIEF DESCRIPTION OF THE DRAWINGS

FIG. 1 is a perspective view of a portion of a fire hydrant showing two embodiments of protection devices in accordance with the present invention installed thereon;

FIG. 2 is an enlarged sectional view of a protection device in accordance with the present invention adapted for use as a water outlet protection device, the section being taken along line 2—2 of FIG. 1;

FIG. 3 is an enlarged sectional view of the protection device of FIG. 2, the section being taken along line 3—3 thereof;

DESCRIPTION OF THE PREFERRED EMBODIMENTS

Figure 4:
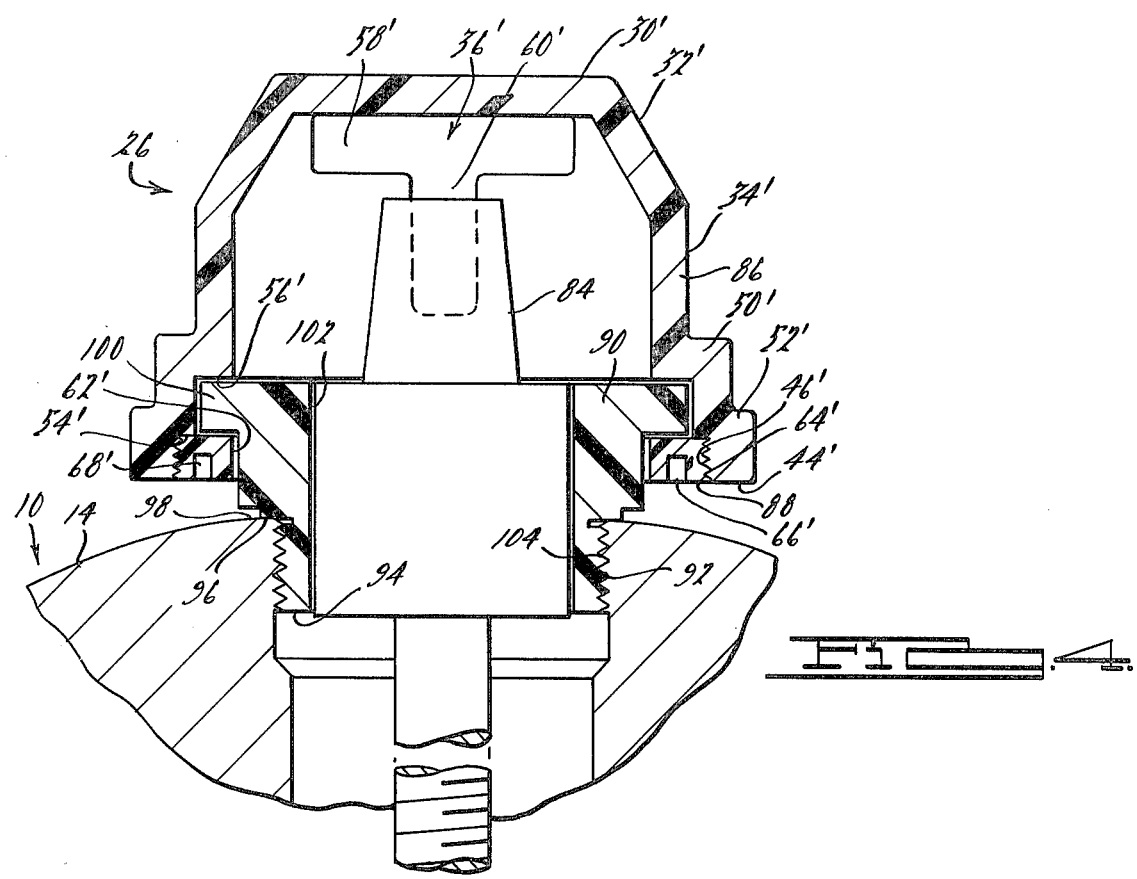
FIG. 4 is an enlarged sectional view of another embodiment of the protection device in accordance with the present invention adapted for use as a valve actuator protector, the section being taken along line 4—4 of FIG. 1.
Figure 5:
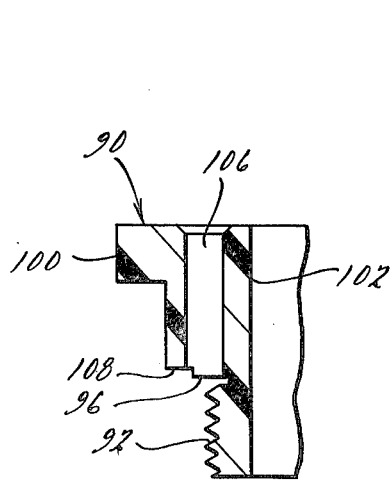
FIG. 5 is an enlarged view of a portion of the embodiment of FIG. 4 illustrating a drain opening provided therein.

Referring now to FIG. 1, there is shown a conventional fire hydrant 10 comprising a generally cylindrical housing 12 having a dome shaped top portion 14 and a pair of spaced water outlet members 16 and 18 projecting outwardly from the housing 12. A valve actuating member is also provided extending outwardly from the center of top portion 14 thereof. As shown therein each of the water outlets 16 and 18 as well as the valve actuating member are provided with protection devices 22, 24, and 26 all in accordance with the present invention.

The water outlet cover member protection device 22 is best seen and will be described in detail with reference to FIGS. 2 and 3. In this embodiment, protection device 22 comprises a generally cylindrical shaped cover member 28 having a closed end 30 and a beveled surface 32 extending outwardly to an annular sidewall portion 34. A plurality of spaced openings 36 are provided in beveled surface 32 and extend into sidewall portion 34 so as to afford access to an interior area 42 enclosed by the cover member. Each of the openings 36 provided in the cover member 28 is generally T-shaped including a circumferentially elongated portion 58 provided in beveled surface 32 and an axially elongated portion 60 extending toward end 44 of the cover member 28 from a central portion of the circumferentially elongated portion 58. The other end 44 of cover member 28 is open and is provided with an internally threaded portion 46 immediately adjacent the outer end thereof which is adapted to receive securing member 48 as described in greater detail below. Cover member 28 also includes a pair of generally annular outwardly extending flange portions 50 and 52 disposed between threaded portion 46 and sidewall portion 34 so as to define shoulders 54 and 56.

Securing member 48 comprises an annular ring having a center opening 62 and a threaded circumferential edge 64 which is adapted to engage threaded portion 46 of cover member 28. A pair of relatively small diameter, shallow, spaced apart axially extending openings 66 and 68 are also provided extending inwardly from radial surface 70 of securing member 48. Generally, only two openings 66 and 68 will be provided spaced apart approximately 180° around the circumference of securing member 48 and are adapted to accommodate the prongs of a specially designed wrench so as to facilitate installation of the protection device of the present invention as is described in greater detail below. As seen in FIG. 2, the thickness of securing member 48 will preferably be no greater than the distance between annular shoulder 54 and end portion 44 of cover member 28.

Protection device 22 also includes attaching means in the form of a modified cap member 72 which is adapted to be secured to water outlet 16 and has provisions for cover member 28 and securing member 48 to be assembled thereto. Cap member 72 is generally cylindrical in shape and has an outwardly extending annular flange portion 74 provided along sidewall portion 76. The interior circumference of cap member 72 is provided with threads 78 which are adapted to cooperate with threaded portion 80 on water outlet 16 so as to allow cap member 72 to be threadedly secured thereto. A centrally disposed axially outwardly extending multisided projection 82 is also provided on end portion 84 of cap member 72 which is adapted to be engaged by a specially designed wrench while may be inserted through any one of the plurality of generally T-shaped openings 36 provided in the cover member 28 so as to enable an individual to remove or install cap member 72 on water outlet 16 or 18 of fire hydrant 10. Preferably cover member 28, cap member 72 and securing member 48 will be fabricated by injection molding from a plastic composition material which is highly resistant to breakage such as for example a ploycarbonate type material. However, as is apparent the protection device may be easily fabricated from other materials such as metals for example should this be desirable for a particular application. The cap member 72 could even be fabricated by machining the existing hydrant cover member if desired.

The outside diameter of cap member 72 is slightly less than the inside diameter of both cover member 28 and center opening 62 of securing member 48. Thus, in order to assemble protection device 22 one need first place cap member 72 inside cover member 28 with annular flange portion 74 engaging shoulder 56. Thereafter, securing member 48 may be brought into engagement with threaded portion 46 so as to retain annular flange portion 74 between member 48 and shoulder 56. Thus, as is apparent, cover member 28 and associated securing member 48 will be able to rotate freely with respect to cap member 72 but yet will be retained in assembled relationship by the cooperation of annular flange portion 74, shoulder 56, and securing member 48.

As seen in FIG. 3, the particular embodiment illustrated is shown with a pentagon shaped multisided projection 82 provided on cap member 72. However, in particular applications projection 82 may be provided with any desired number of sides thereon although it will be preferable to provide an odd number as conventional wrenches are generally designed to accommodate nuts or the like having an even number of sides. It should also be noted that as cap member 72 is totally disposed within the cover member 28 and in that cover member 28 is freely rotatable with respect to the cap member 72, it is impossible for an individual using commercially available tools to obtain a grip upon any portion of cap member 72. Thus, it is extremely difficult if not impossible for any unauthorized individuals not having a specially designed wrench such as that described below to remove the cap member.

Protection device 26 represents another embodiment of the present invention adapted for use in preventing unauthorized actuation of a valve actuating member 84 and is illustrated in detail in FIG. 4. Protection device 26 includes a cover member 86 and associated securing member 88 both of which are substantially identical in general shape to cover member 28 and securing member 48 although of a slightly reduced diameter and cap member 86 may be slightly longer. Accordingly, corresponding portions thereof are indicated by corresponding numbers primed and further description thereof will be omitted as unnecessarily repetitious. However, in this embodiment cap member 72 is replaced by a generally elongated cylindrically shaped member 90 having a threaded portion 92 adjacent one end 94 thereof which terminates at a shoulder portion 96 adapted to engage a surface portion 98 of the hydrant 10. Additionally, an annular flange portion 100 is provided thereon which corresponds with flange portion 74 and is adapted to be received within the recess defined by securing member 88 and shoulder 56' so as to be freely rotatable therein. Elongated member 90 also includes a relatively large diameter centrally disposed axially extending opening 102 which is adapted to accommodate valve actuating member 84. Threaded portion 92 is adapted to be threaded into a threaded opening 104 conventionally provided in domed portion 14 of the hydrant 10 surrounding the valve actuating member 84. Preferably elongated member 90 will be sized so as to position cover member 86 and associated securing member 88 only a small distance above portion 14 of hydrant 10 so as to prevent an individual from gaining access thereto with conventional tools.

In order to install protection device 26 on hydrant 10, one need merely thread elongated member 90 into opening 104 and then assemble cover member 86 and securing member 88 thereto in the same manner as described above. Additionally, should it be desirable a suitable adhesive may be applied to the mating threads of elongated member 90 and opening 104 to provide additional insurance against removal of the protection device. It should also be noted that should it be desirable, a suitable adhesive may also be applied to the threads of either securing member 48 or 88 and/or cover member 28 or 86 so as to provide additional protection against unauthorized removal of the protection device and/or operation of the valve actuator.

As the valve actuation protection device 26 is adapted to be mounted on the upper surface of the fire hydrant, it will generally be desirable to provide a drain opening in the elongated member. This may be easily done by providing a longitudinally extending opening 106 radially offset from centrally disposed opening 102 provided therein which opens out at shoulder portion 108 provided on elongated member 90 adjacent the hydrant engaging shoulder portion 96 provided thereon. Thus, any snow, rain or the like accumulating within the area enclosed by cover member 86 will be allowed to drain readily outward through this opening thereby insuring that accumulations of water and/or ice will not build up which may prevent or otherwise interfere with the operation of the valve actuating member.

Figure 6:
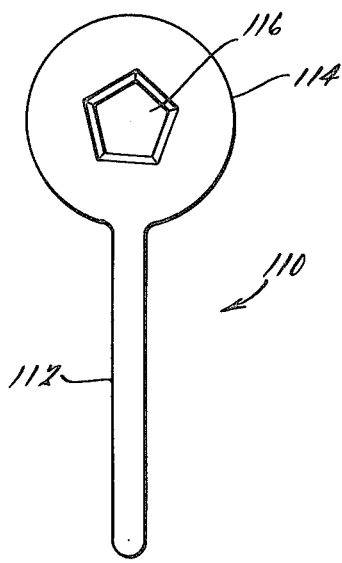
FIG. 6 is a view of a specially designed wrench adapted to allow removal of the cover member of the present invention and operation of the valve actuator.

In order to actuate either the valve actuating means or to remove the cap member from the fire hydrant such as when it is necessary to connect a water line thereto, a specially designed wrench 110 as illustrated in FIG. 6 is provided. Wrench 110 includes an elongated handle portion 112 having an enlarged generally round end portion 114 provided thereon with a pentagon-shaped opening 116 centrally disposed therein. The diameter of end portion 114 is designed to allow wrench 110 to be inserted through the circumferentially elongated portion 58 of the T-shaped openings 30 so as to enable the pentagon-shaped opening provided therein to be placed over either multisided protrusion 82 provided on cap member 72 or the valve actuating member. Thereafter, handle portion 112 of wrench 110 is moved into axially elongated portion 60 of the generally T-shaped opening 30 thereby allowing either the valve actuating member or multisided protrusion to pass through opening 116 provided in end portion 114 of wrench 110. Wrench 110 may then be rotated causing rotation of either cap member 72 or valve actuating member 84. However, as cover members 28 and 86 fully enclose and are able to freely rotate with respect to either cap member 72 or valve actuating member 84, removal of cap member 72 or operation of valve actuating member 84 is effectively prevented absent wrench 110. It should be noted that openings 36 and 36' will preferably be sized so as to effectively prevent conventional tools from being inserted therein.

Thus, as is apparent, the present invention provides an extremely inexpensive means by which unauthorized tampering with the fire hydrant may be easily prevented and further eliminates the possibility that damage may result from debris which may accumulate within the fire hydrant unknown to the users thereof.

While it will be apparent that the preferred embodiments of the invention disclosed are well calculated to provide the advantages above stated, it will be appreciated that the invention is susceptible to modification, variation, and change without departing from the proper scope or fair meaning of the subjoined claims.

I claim:

1. A protection device for fire hydrants comprising:
a cover member having at least one opening provided therein;
securing means engageable with one end of said cover member and cooperating therewith to define a radially outwardly extending annular recess adjacent said one end; and
attaching means threadedly engaging a portion of said fire hydrant for attaching said cover member and said securing means to a fire hydrant, said attaching means including an annular flange portion receivable within said annular recess cooperating with said securing means and said cover member to allow rotational movement of said cover member and securing means with respect to said attaching means, said opening in said cover member being so disposed as to provide access to an area enclosed by said cover member and said attaching means.

2. A protection device for fire hydrants as set forth in claim 1 wherein said opening in said cover member is disposed in a sidewall portion thereof.

3. A protection device for fire hydrants as set forth in claim 1 wherein said cover member, said attaching means and said securing means are fabricated from a plastic composition.

4. A protection device for fire hydrants as set forth in claim 1 wherein said securing means comprises an annular ring engaging said cover member.

5. A protection device for fire hydrants as set forth in claim 1 wherein said attaching means comprises a cap member adapted to be secured to an outlet of said fire hydrant.

6. A protection device for fire hydrants as set forth in claim 5 wherein said cap portion is disposed entirely within said cover member.

7. A protection device for fire hydrants as set forth in claim 5 wherein said cap member further includes a multisided projection extending into said area enclosed by said cover member, said multisided projection being adapted to be engaged by a wrench thereby enabling removal of said cap from said hydrant.

8. A protection device for fire hydrants as set forth in claim 7 wherein said multisided projection includes an odd number of sides.

9. A protection device for fire hydrants as set forth in claim 5 wherein said cap member is provided with an internally threaded portion for securing said cap member to said hydrant.

10. A protection device for fire hydrants as set forth in claim 1 wherein said attaching means comprises an elongated member having a longitudinal extending opening provided therein, said opening being adapted to accommodate a valve actuating member associated with said fire hydrant.

11. A protection device for fire hydrants as set forth in claim 10 wherein said attaching means includes a threaded portion provided on the outer circumference of said elongated member.

12. A protection device for fire hydrants as set forth in claim 10 wherein said elongated member further includes a second longitudinal extending opening laterally displaced from said first opening for placing said area in communication with another area outside of said cover member.

13. A protection device for fire hydrants as set forth in claim 1 wherein said one end of said cover member has an enlarged diameter opening in which said securing means is received, said enlarged diameter opening and said securing means cooperating to define said recess.

* * * * *